(12) United States Patent
Michael

(10) Patent No.: US 7,290,085 B2
(45) Date of Patent: Oct. 30, 2007

(54) METHOD AND SYSTEM FOR FLEXIBLE AND EFFICIENT PROTOCOL TABLE IMPLEMENTATION

(75) Inventor: Maged M. Michael, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/989,751

(22) Filed: Nov. 16, 2004

(65) Prior Publication Data

US 2006/0106976 A1    May 18, 2006

(51) Int. Cl.
*G06F 12/00* (2006.01)
(52) U.S. Cl. ........................ 711/108; 711/141; 711/156; 711/221; 365/49
(58) Field of Classification Search ................ 711/108, 711/141, 156, 221; 365/49
See application file for complete search history.

(56) References Cited

U.S. PATENT DOCUMENTS

| | | | |
|---|---|---|---|
| 5,341,483 A * | 8/1994 | Frank et al. | 711/206 |
| 6,715,057 B1 * | 3/2004 | Kessler et al. | 711/207 |
| 6,751,698 B1 * | 6/2004 | Deneroff et al. | 710/317 |
| 6,892,273 B1 * | 5/2005 | James et al. | 711/108 |
| 2005/0053057 A1 * | 3/2005 | Deneroff et al. | 370/360 |

* cited by examiner

*Primary Examiner*—Stephen C. Elmore
(74) *Attorney, Agent, or Firm*—F. Chau & Associates, LLC

(57) ABSTRACT

A method for accessing a protocol table includes providing a content addressable protocol table comprising a plurality of entries, wherein each entry includes a key field and an output field, constructing a key value from a protocol input, associatively searching the table for an entry whose key field matches the key value constructed from the input, and returning the output field of an entry whose key field matches that of the key value. The table optionally includes a mask field, and searching the table includes seeking the entry whose key field matches a bitwise AND of its mask field with the key value. An error is generated if no matching entry is found on the table.

20 Claims, 7 Drawing Sheets

METHOD AND SYSTEM FOR FLEXIBLE AND EFFICIENT PROTOCOL TABLE IMPLEMENTATION

TECHNICAL FIELD

The present invention relates generally to the implementation of protocols, such as cache coherence protocols.

DESCRIPTION OF RELATED ART

A protocol specifies the set of actions to be taken by a system component in response to events in all possible states. Protocol implementations can be hardwired, or they can be implemented in software using fully programmable processors or using programmable tables. Each implementation has drawbacks. Hardwired implementations increase development time and cannot be modified after tapeout. Software or fully programmable implementations are inefficient. Table-based programmable implementations typically require large table sizes for flexibility.

The latter implementation uses a concatenation of event encoding and state encoding as an index into the table specifying the protocol. If x bits are used for encoding events and y bits are used for encoding states, then up to $2^x$ distinct events can be encoded, and up to $2^y$ can be defined. The table size is $2^{x+y}$ entries. The table is loadable to allow protocol flexibility for improving performance as well as for correcting protocol errors. However, the more flexibility that is allowed means the more the table size grows. In order to keep the size of the table practical, states need to be packed carefully using as few bits as possible. This reduces the flexibility of the protocol significantly. For example, suppose 5 bits were assigned for a certain state component, and a protocol problem was discovered for which the best solution required 33 distinct values for that state component, then that solution is not feasible. If more bits were dedicated beforehand, that table size increases exponentially and can require multi-cycle access time.

SUMMARY OF THE INVENTION

For most protocols, the number of distinct cases is typically much less than $2^{x+y}$, where x and y are the binary logarithms of the number of events and states, respectively. The size of the protocol table can be reduced by adding a key field to each entry in the protocol table. A larger key field provided greater flexibility. By using a one-cycle associative search in the table, the number of entries in the table can be independent of the key size. This allows more bits to be used in the key components, and more bits can be dedicated to components that are completely defined by the protocol, such as inter-node requests and responses and transient states. In addition, state bits need not be packed tightly, thus increasing flexibility.

A protocol table in accordance with the invention includes key fields and action fields. Whenever a protocol event, such as an incoming command, requires protocol action, a key can be formed as follows. An event identifying component can be extracted, for example from an incoming message. Bits that identify the current state can be extracted from, for example, a pending buffer or a memory directory. A key is then formed to be used for associative lookup in the protocol table. The output of the lookup is a set of action fields in the table entry with a matching key field. If a match is not found between the formed key and a matching key field in the table, then there is a protocol error.

In accordance with the invention, there is provided a method for accessing a table comprising the steps of providing a content addressable table comprising a plurality of entries, wherein each entry includes a key field and an output field, constructing a key value from an input, searching the table for an entry whose key field matches the key value constructed from the input, and returning the output field of an entry whose key field matches that of the key value.

In a further aspect of the invention, the step of searching of the table comprises an associative search.

In a further aspect of the invention, the method includes generating an error if no entry on the table has a key field that matches the key value.

In a further aspect of the invention, the table further includes a mask field, and the step of searching the table further comprises seeking the entry whose key field matches a bitwise AND of its mask field with the key value.

In a further aspect of the invention, the table is a protocol table, and the output field of the protocol table is indicative of an action to be taken.

In a further aspect of the invention, the input includes a command and a state machine state indicator, wherein the key value is determined from the command and state indicator.

In another aspect of the invention, there is provided a program storage device readable by a computer, tangibly embodying a program of instructions executable by the computer to perform the method steps for accessing a protocol table.

DETAILED DESCRIPTION OF THE PREFERRED EMBODIMENTS

It is to be understood that the present invention may be implemented in various forms of hardware, software, firmware, special purpose processors, or a combination thereof. Preferably, the present invention is implemented as a combination of both hardware and software, the software being an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations or configurations of the present invention.

Figure 1:
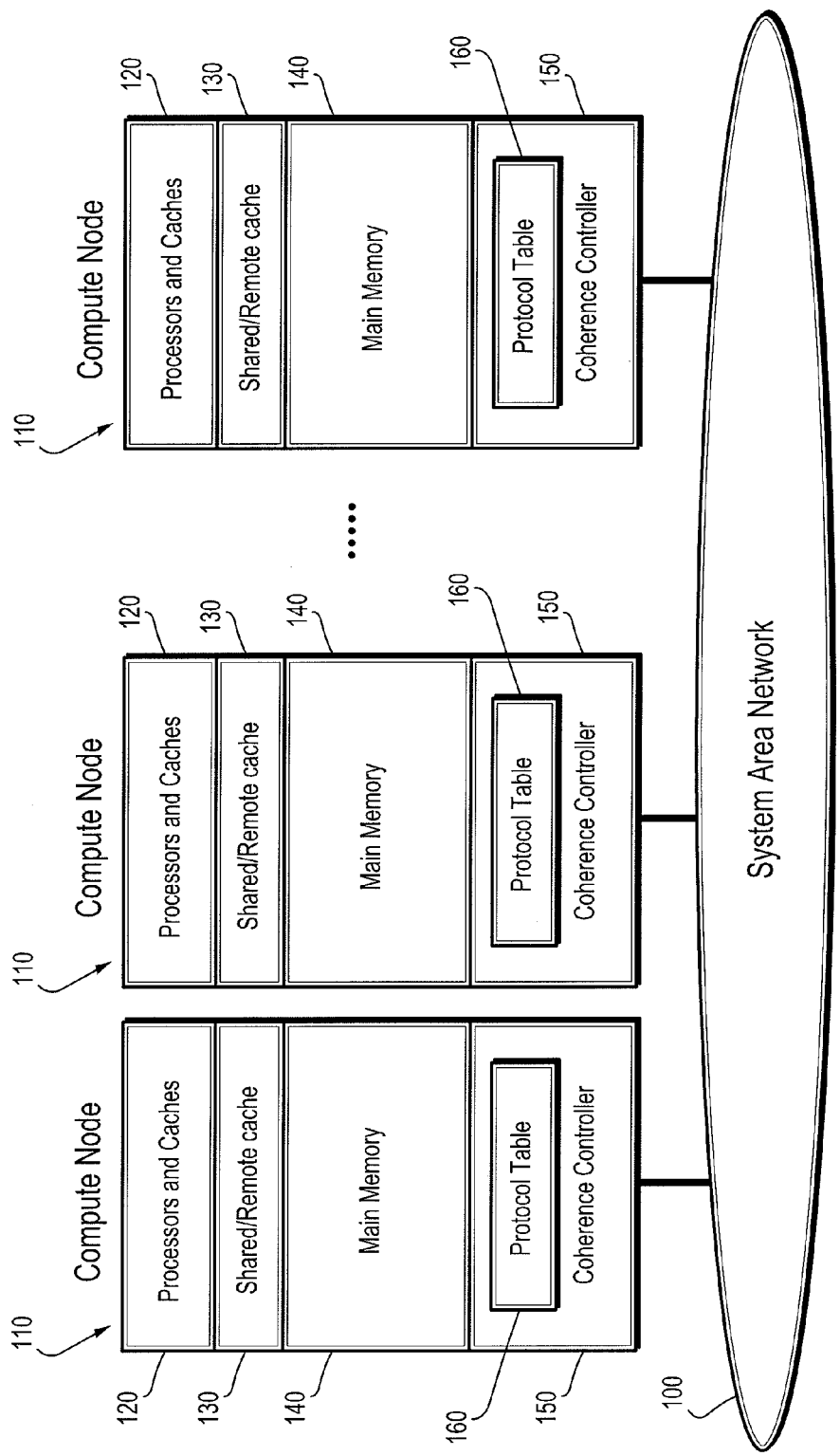
FIG. 1 shows an example of a system environment incorporating the current invention.

FIG. 1 depicts an exemplary system environment for implementing the methods and systems of the present invention. The system includes one or more computing devices 110, each of which can comprise, inter alia, one or more processors ands caches 120, a shared/remote cache 130, a main memory 140, and a coherence controller 150 that includes a protocol table 160. The computer devices 110 are interconnected through a system area network 100, which can be a local area network, or a global network, such as the Internet. Computing device 110 can additionally include an I/O interface (not shown) which couples to a display (not shown) and various input devices such as a mouse and a keyboard (not shown). The support circuits can include circuits such as cache, power supplies, clock circuits, and a communication bus. The memory 140 can include random access memory (RAM), read only memory (ROM), disk drive, tape drive, etc., or a combinations thereof.

The computing device 110 also includes an operating system and microinstruction code. The various processes and functions described herein can either be part of the microinstruction code or part of the application program (or combination thereof), which is executed via the operating system. In addition, various other peripheral devices can be connected to the computer platform such as an additional data storage device and a printing device. The system depicted here is exemplary, and the invention is applicable to any finite state machine (or protocol) where the number of possible inputs (states, operations, etc) is large. One such usage in current systems is that of cache coherence protocols for large scale shared memory multiprocessor systems, however, the invention can be implemented in any computing or network system that utilizes a protocol.

Figure 2:
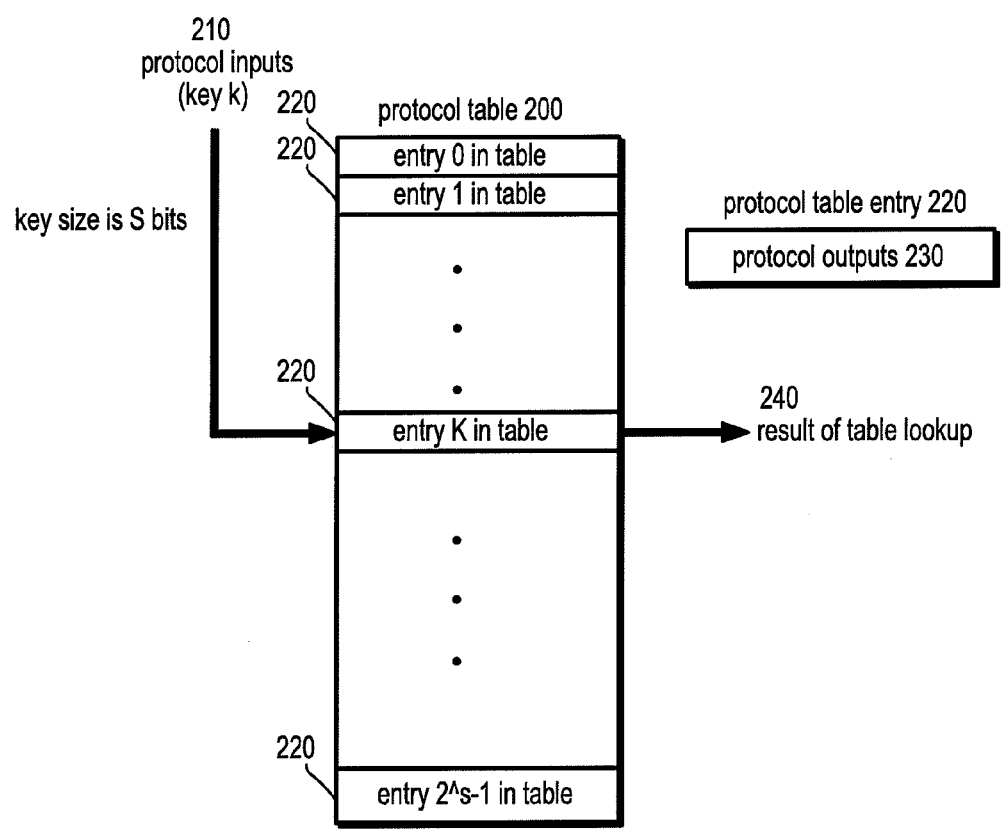
FIG. 2 shows an example implementation of a conventional protocol table.

FIG. 2 depicts an implementation of a conventional protocol table. Protocol table 200 includes $2^s$ entries 220, which can be indexed by numbers in the range 0 . . . $2^s$-1. Each protocol table entry 220 includes a protocol output 230, which specifies an action result 240 of a protocol table lookup. The protocol table 200 can be accessed by a protocol input 210, which includes a key comprising S bits. More precisely, if the range of possible key values is from 0 to M-1 then the table size is M entries. Note that the number of key values (say K) actually used can be much less than M.

Figure 3:
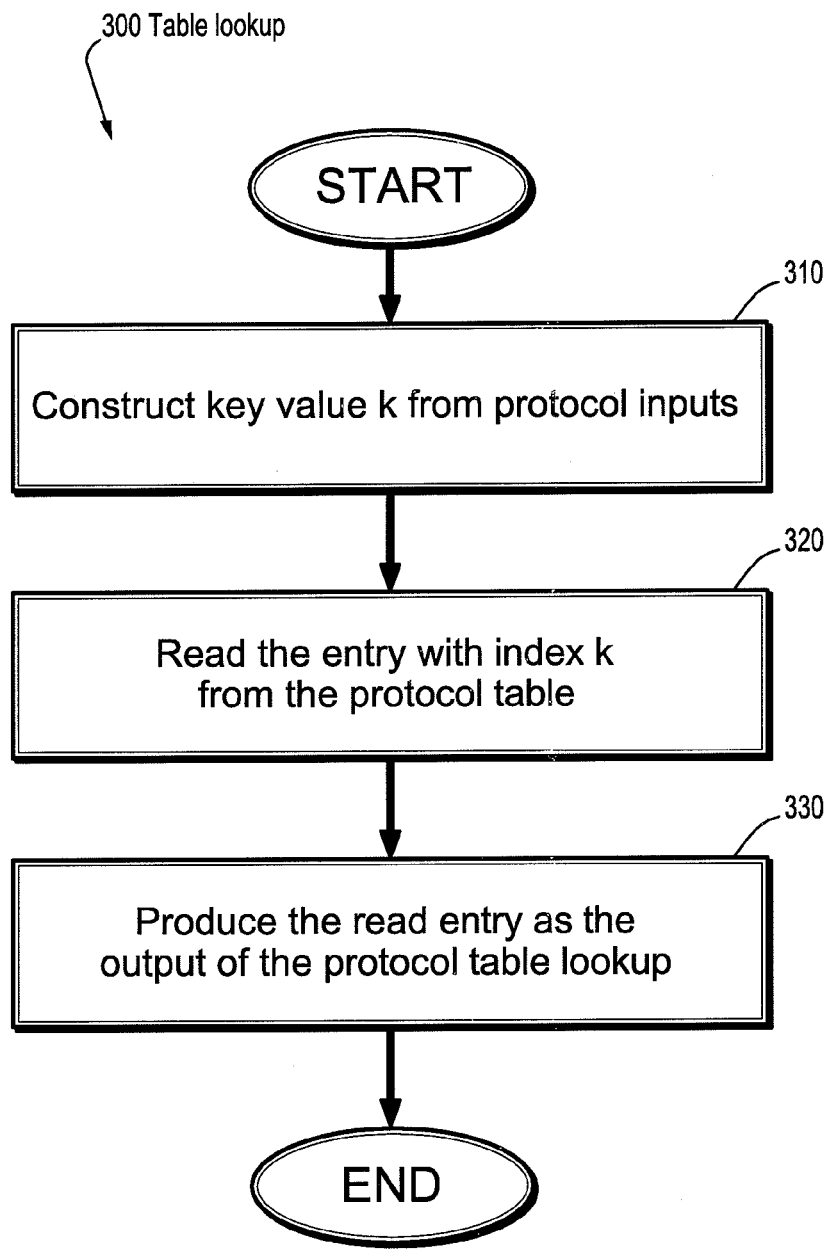
FIG. 3 shows the lookup method implementation of a conventional protocol table.

FIG. 3 depicts a lookup method 300 for the table depicted in FIG. 2. A key value k is constructed at step 310 from the protocol inputs. These inputs include commands and an indicator of the current state. Commands can include requests/responses from local or remote nodes, memory directory or remote cache evictions, or internal commands. The internal state refers to the state of a state machine that is utilizing the protocol table, and includes the state of the command source node, a stable state such as a memory directory or remote cache directory access, a transient state as in the case of a pending buffer, address or resource conflicts, the status of data, or whether the command is for a last expected response. Once the key k is constructed, it is used to read 320 the corresponding protocol table entry. The protocol output is returned from the table at step 330. A protocol table output is indicative of an action to be taken, and can include sending an outgoing message to a requester or home nodes an action on a pending buffer, updating a stable state, updating a transient state bit vector, transitioning to a new transient state, returning the status of data, performing an action on a remote cache, such as a read or write, etc.

Figure 4:
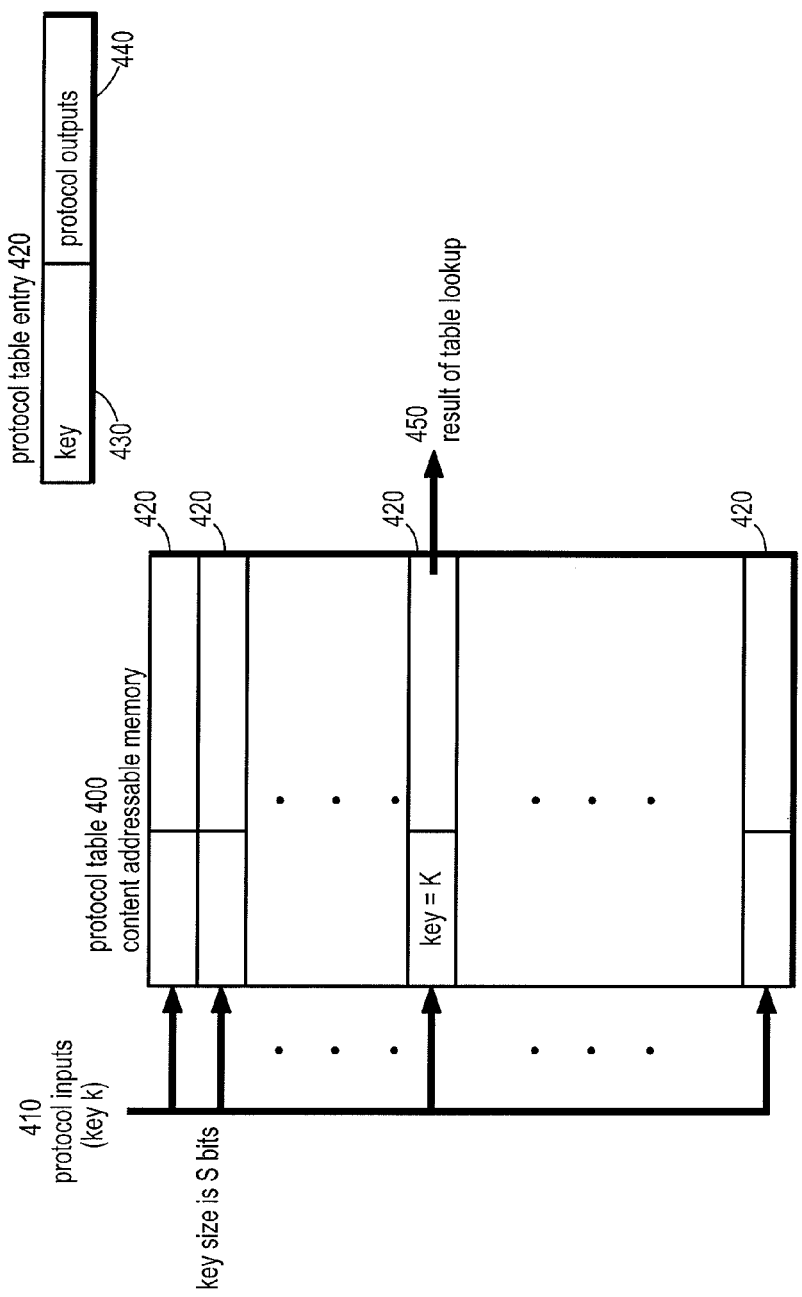
FIG. 4 shows one embodiment using content addressable memory and key fields included in protocol table entries.

FIG. 4 depicts an implementation of one embodiment of a protocol table in accordance with the invention. Protocol table 400 is content addressable, and includes a plurality of table entries 420. Each protocol table entry 420 further includes a key field 430 and an output field 440, which will be the result 450 of a table lookup. The protocol input 410 includes a key of size S bits. If the number of possible key values is K, then the table size is K entries, or slightly more to accommodate possible changes. The table should be designed so that each key field is unique, so that there is exactly one output field for each possible key field.

Figure 5:
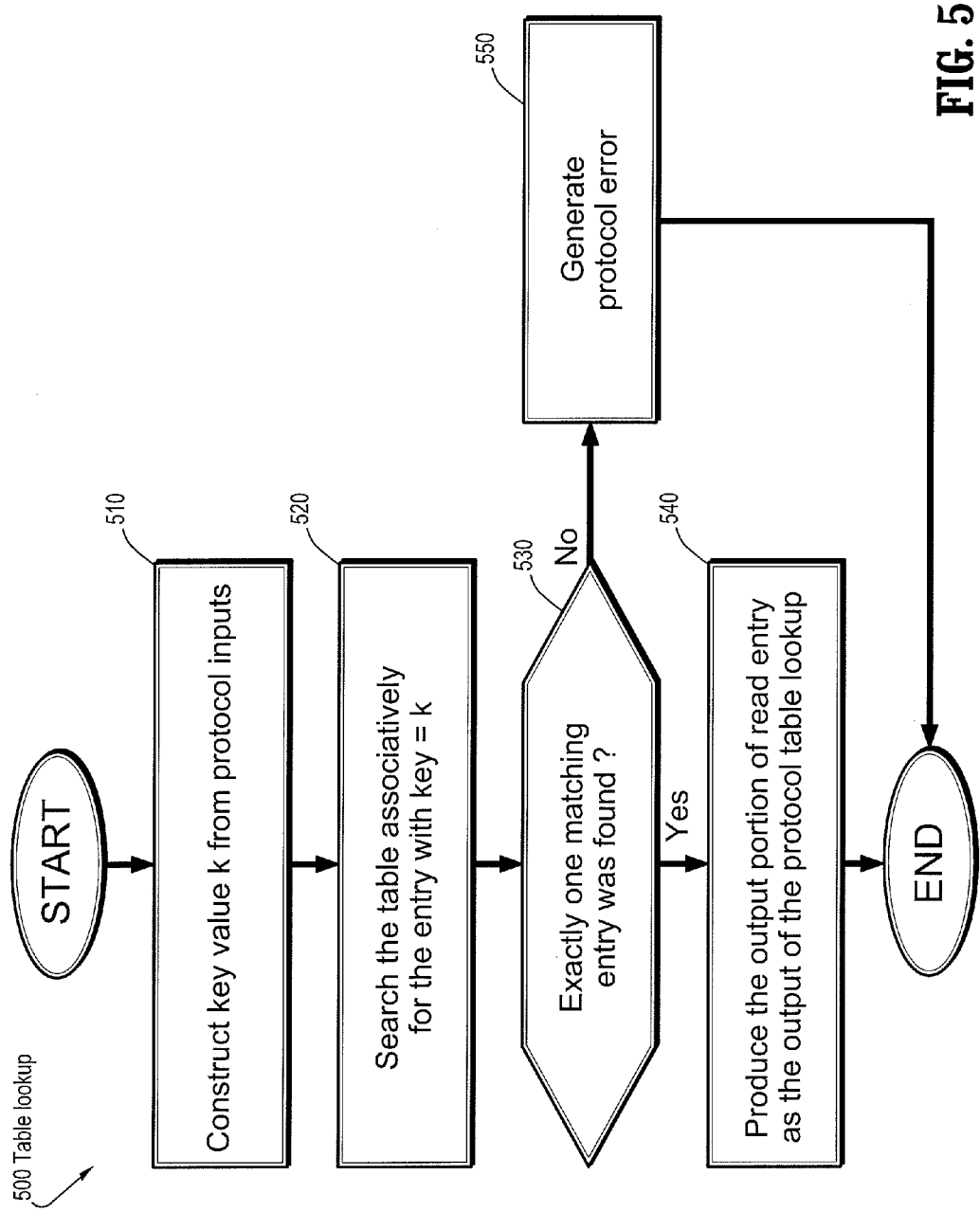
FIG. 5 shows the method for lookup in an embodiment using content addressable memory and key fields included in protocol table entries.

FIG. 5 depicts a lookup method 500 for the table depicted in FIG. 4, in accordance with the invention. A key value k is constructed from the protocol inputs at step 510. As in the conventional case, the inputs include a command and an indicator of the current state. Methods of forming a key value from a command indicator and a state indicator are known in the art. The table 400 is searched associatively at step 520 for an entry with key=k. If, at step 530, exactly one matching entry was found, then the corresponding output portion 440 of the protocol table entry is returned at step 540 as the result of the table lookup operation. However, if no matching entry is found in the table, a protocol error is generated at step 550. This error can be in the form of an exception. Similarly, a table with more than one action for a given set of inputs is an error condition.

Figure 6:
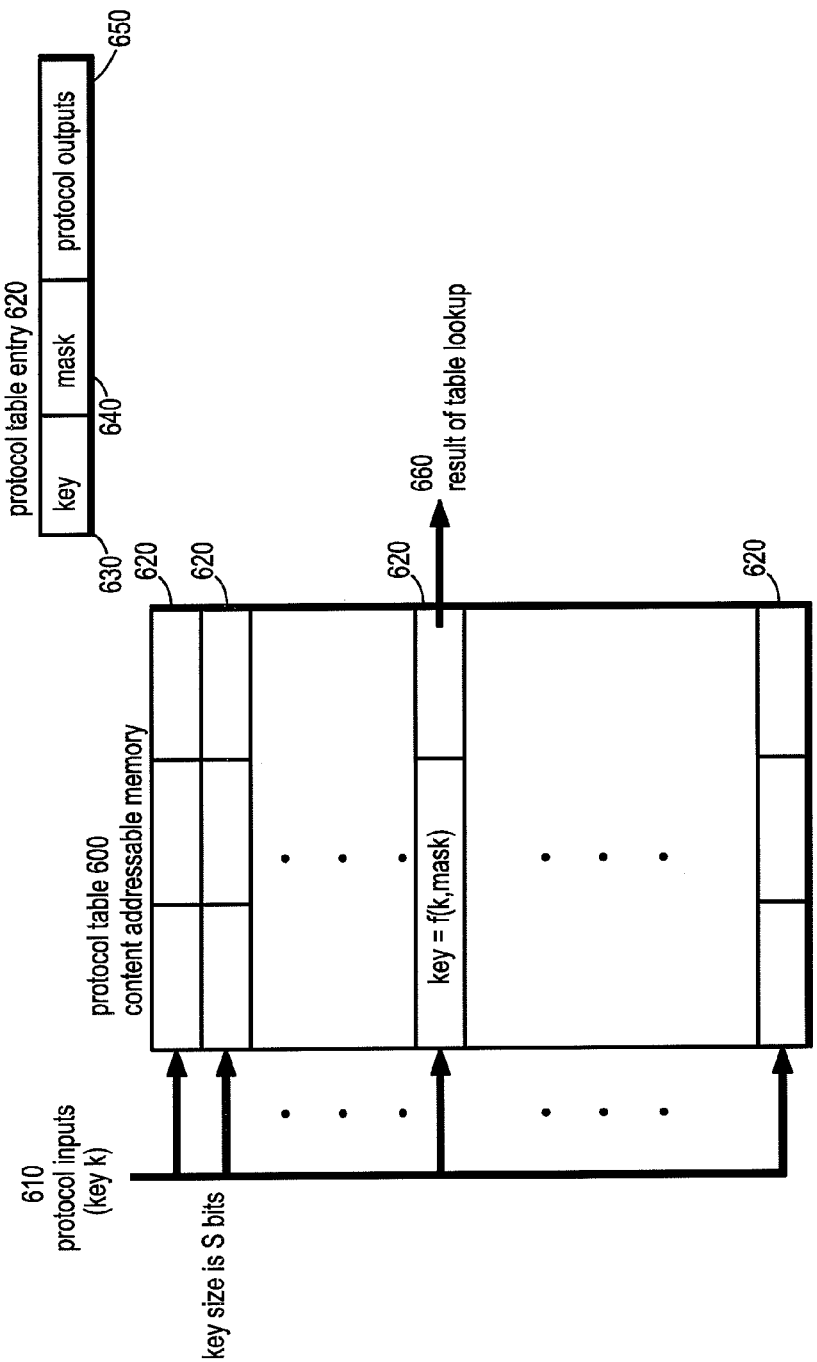
FIG. 6 shows an embodiment using content addressable memory, with key and mask fields included in protocol table entries.

FIG. 6 depicts an implementation of another embodiment of a protocol table in accordance with the invention. Protocol table 600 is content addressable, and includes a plurality of table entries 620. Each protocol table entry 620 further includes a key field 630, a mask field 640, and an output field 650, which is produced as the result 660 of a protocol table lookup operation. The protocol input 610 includes a key k of S bits. The inclusion of a mask field in the protocol table entry can allow a smaller table size for a larger number of key values. The mask can cover all or part of the key field. A mask bit is clear (i.e., zero) if the corresponding key bit is immaterial to choosing the entry. In this embodiment, the key field is compared to a function of the mask field and the input key value. The table should be designed so that each key field is unique, so that there is there is exactly one output field for each possible combination of input key value and mask field.

Figure 7:
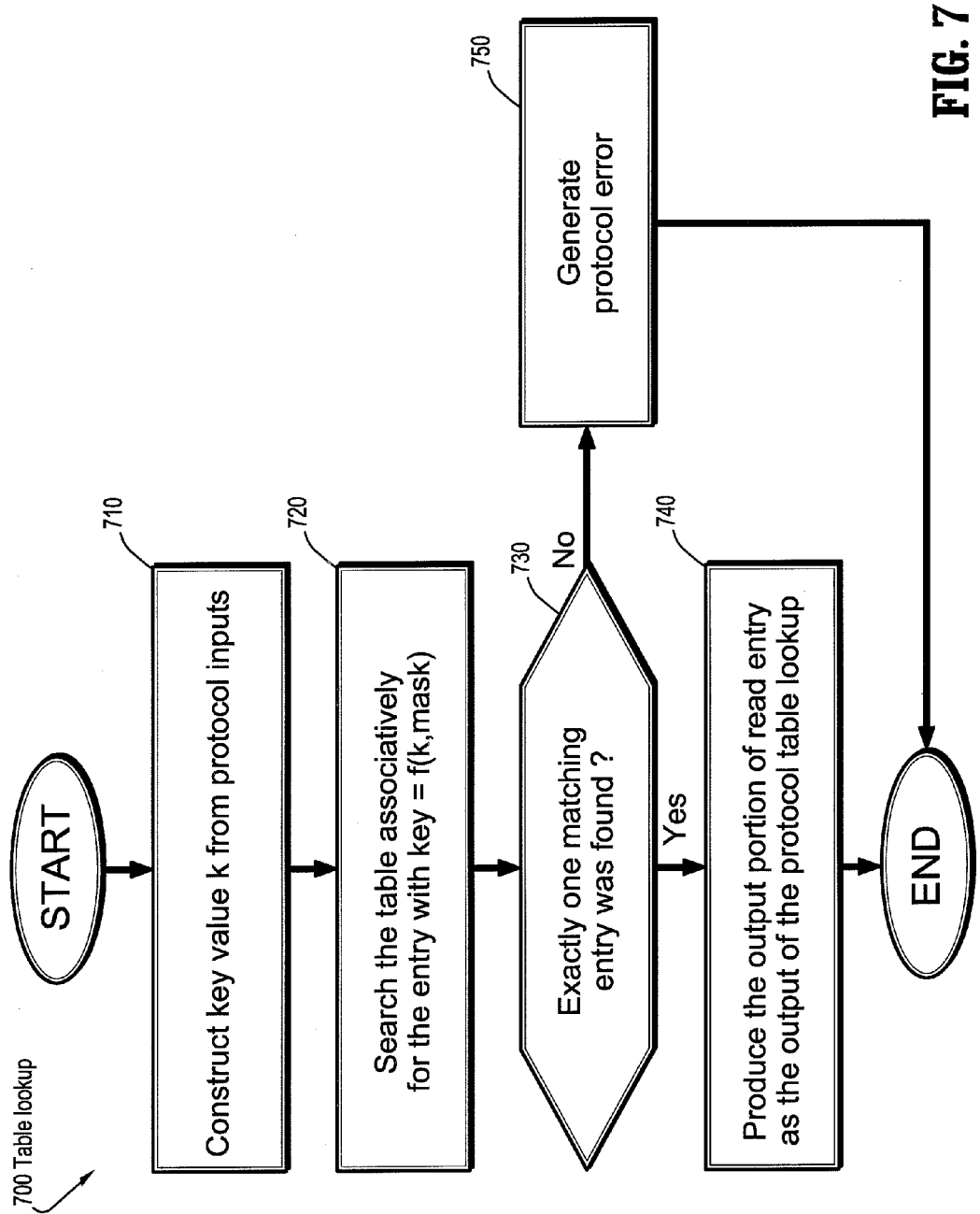
FIG. 7 shows a lookup method in an embodiment using content addressable memory, with key and mask fields included in protocol table entries.

FIG. 7 depicts a lookup method 700 for the table depicted in FIG. 6, in accordance with the invention. A key value k is constructed from the protocol inputs at step 710, as before. At step 720, the table is associatively searched for the entry with key=f(k, mask), where f is a function of the key value and the mask field. In one embodiment, this function can be a bitwise AND of the mask and key value. Alternatively, a bitwise OR function can also be used by flipping all of the bits. These functions are exemplary, and other functions of the mask and key value are within the scope of the invention. If, at step 730, exactly one matching entry was found, then the output portion 650 of the protocol table entry is returned at step 740 as the result of the table lookup operation. Thus, the entry chosen to provide the output of the protocol table lookup is the entry with a function of its mask field equal and the input key equal to its key field. However, if no matching entry is found in the table, a protocol error or exception is generated at step 750. Similarly, a table with more than one action for a given set of inputs and mask is an error condition.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for accessing a protocol table comprising the steps of:
   providing a content addressable protocol table comprising a plurality of entries, wherein each entry includes a key field and an output field;
   constructing a key value from a protocol input;
   performing an associative search of the protocol table for an entry whose key field matches the key value constructed from the input; and
   returning the output field of an entry whose key field matches that of the key value.

2. The method of claim 1, further comprising the step of generating an error if no entry on the table has a key field that matches the key value.

3. The method of claim 1, wherein the table further includes a mask field, and the step of searching the table further comprises seeking the entry whose key field matches a function of its mask field with the key value.

4. The method of claim 3, wherein the function is a bitwise AND of the mask field and the key value.

5. The method of claim 3, wherein the function uses a bitwise OR of the mask field and the key value.

6. The method of claim 1, wherein the table is a protocol table, and the output field of the protocol table is indicative of an action to be taken.

7. The method of claim 1, wherein the input includes a command and a state machine state indicator, wherein the key value is determined from the command and state indicators.

8. The method of claim 1, wherein each key field in the table is unique, and wherein the table has one output field for each key field.

9. A method for accessing a protocol table comprising the steps of:
   providing a content addressable protocol table comprising a plurality of entries, wherein each entry includes a key field and an output field indicative of an action to be taken, wherein each key field is unique;
   constructing a key value from a protocol input, wherein the protocol input includes a command and a state machine state indicator, wherein the key value is determined from the command and state indicator;
   performing an associative search of the protocol table for an entry whose key field matches the key value constructed from the protocol input;
   returning the output field of an entry whose key field matches that of the key value; and
   generating an error if no entry in the protocol table has a key field that matches the key value.

10. The method of claim 9, wherein the protocol table further includes a mask field, and the step of searching the protocol table further comprises seeking the entry whose key field matches a function of the entry's mask field with the key value.

11. The method of claim 10, wherein the function is a bitwise AND of the mask field and the key value.

12. The method of claim 10, wherein the function uses a bitwise OR of the mask field and the key value.

13. A program storage device readable by a computer, tangibly embodying a program of instructions executable by the computer to perform the method steps for accessing a protocol table comprising the steps of:
   providing a content addressable protocol table comprising a plurality of entries, wherein each entry includes a key field and an output field;
   constructing a key value from a protocol input;
   associatively searching the protocol table for an entry whose key field matches the key value constructed from the input; and
   returning the output field of an entry whose key field matches that of the key value.

14. The computer readable program storage device of claim 13, wherein the method further comprises the step of generating an error if no entry on the table has a key field that matches the key value.

15. The computer readable program storage device of claim 13, wherein the protocol table further includes a mask field, an the step of searching the protocol table further comprises seeking the entry whose key field matches a function of entry's mask field with the key value.

16. The computer readable program storage device of claim 15, wherein the function is a bitwise AND of the mask field and the key value.

17. The computer readable program storage device of claim 15, wherein the function uses a bitwise OR of the mask field and the key value.

18. The computer readable program storage device of claim 13, wherein the output field of the protocol table is indicative of an action to be taken.

19. The computer readable program storage device of claim 13, wherein the input includes a command and a state machine state indicator, wherein the key value is determined from the command and state indicators.

20. The computer readable program storage device of claim 13, wherein each key field in the table is unique, and wherein the table has one output field for each key field.

* * * * *